(12) United States Patent
Nakazawa

(10) Patent No.: US 10,338,235 B2
(45) Date of Patent: Jul. 2, 2019

(54) RADIATION DETECTOR

(71) Applicant: SHIMADZU CORPORATION, Kyoto-shi, Kyoto (JP)

(72) Inventor: Masayuki Nakazawa, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 468 days.

(21) Appl. No.: 15/076,723

(22) Filed: Mar. 22, 2016

(65) Prior Publication Data

US 2017/0276806 A1 Sep. 28, 2017

(51) Int. Cl.
G01T 1/208 (2006.01)
G01T 1/20 (2006.01)
G01T 1/17 (2006.01)

(52) U.S. Cl.
CPC .............. G01T 1/208 (2013.01); G01T 1/171 (2013.01); G01T 1/2018 (2013.01)

(58) Field of Classification Search
CPC ........ G01T 1/208; G01T 1/2018; G01T 1/171
USPC ........................................................ 250/362
See application file for complete search history.

(56) References Cited

U.S. PATENT DOCUMENTS

2006/0015290 A1* 1/2006 Warburton ................ G01T 1/17
702/178

FOREIGN PATENT DOCUMENTS

JP 2001-108750 A 4/2001

* cited by examiner

Primary Examiner — David P Porta
Assistant Examiner — Meenakshi S Sahu
(74) Attorney, Agent, or Firm — Sughrue Mion, PLLC

(57) ABSTRACT

The radiation detector according to the present invention is always able to calculate the summation value accurately, regardless of the intensity of the fluorescent emission that is produced in the scintillator. That is, if the method for calculating the summation value set forth in the present invention is used, then the number of instantaneous intensity data d that are added together each time a fluorescent emission is produced in the scintillator will be larger the greater the intensity of the fluorescent emission. Doing this prevents the intensity of an intense fluorescent emission from being understated. Moreover, the summing portion in the present invention is able to calculate the summation value with high reliability. This is because the instantaneous intensity data used in calculating the summation value are above a threshold value a, causing the signal-to-noise ratios to be adequately high and the reliability to be high as well.

11 Claims, 19 Drawing Sheets

| PEAK VALUE | SUMMATION VALUE S |
|---|---|
| h0 | Sa0 |
| h1 | Sa1 |
| h2 | Sa2 |
| h3 | Sa3 |

RADIATION DETECTOR

TECHNICAL FIELD

The present invention relates to a radiation detector that corrects a detection signal for an annihilation radiation pair, and, in particular, relates to a radiation detector structured so as to convert radiation into a fluorescent emission and to measure this fluorescent emission.

BACKGROUND ART

A specific structure for a conventional positron emission tomography apparatus (PET), for imaging the distribution of a radiopharmaceutical, will be explained. A conventional PET apparatus is provided with a detector ring wherein radiation detectors, which detect radiation, are arranged in a circular ring shape. This detector ring detects pairs of radiation (known as "annihilation radiation pairs") that are emitted in opposite directions from a radiopharmaceutical within the body of a subject.

The structure of a radiation detector 51 will be explained. The radiation detector 51, as illustrated in FIG. 17, comprises scintillators 52 that are arranged three-dimensionally, and a photodetector 53 for detecting fluorescent emission produced from the radiation absorbed by the scintillators 52. The photodetector 53 is provided with a detecting surface wherein a large number of photodetecting elements are arranged in a matrix. Given this, the detecting face of the photodetector 53 and one face of the scintillator 52 are coupled optically.

When radiation is incident on a scintillator 52, a fluorescent emission is produced within the scintillator 52. This fluorescent emission requires some time in order to decay completely. As a result, the scintillator 52 will continue to emit light weakly for some time when there is incident radiation.

One method for measuring such a fluorescent emission is a method wherein the intensity of the fluorescent emission is sampled at regular time intervals. Because such a method has the simplicity of detecting the fluorescent emission discontinuously, there is a benefit in that the structure of the circuit for the radiation detector 51 can be simplified to some degree.

The top section in FIG. 18 is for explaining a conventional method for measuring a fluorescent emission. When a fluorescent emission is produced in the scintillator 52, the intensity of the fluorescent emission exhibits a sharply rising edge, after which it gradually diminishes. The radiation detector 51 measures the instantaneous intensities of the fluorescent emission at the times indicated by the dotted line at the top in FIG. 18. Given this, at the time of evaluating the degree of intensity of the fluorescent emission, having some duration in time, in the scintillator 52, a summation value is used wherein fluorescent intensities obtained at different moments are added together. The greater the summation value, the more intense the fluorescent emission produced can be assumed to be.

The number of instantaneous fluorescent intensities that are to be added together when calculating the summation value is determined in advance in the fluorescent emission detector. In the example at the bottom in FIG. 18, the structure is such that fluorescent intensities from 7 points in time are summed together to arrive at the summation value (referencing, for example, Patent Document 1).

PRIOR ART DOCUMENT

Patent Document

[Patent Document 1] Japanese Unexamined Patent Application Publication 2001-108750

SUMMARY OF THE INVENTION

Problem Solved by the Present Invention

However, the conventional radiation detector has problems such as the following.

The conventional radiation detector is unable to calculate the summation value properly, depending on the fluorescent intensity.

Let us assume that a fluorescent emission produced in the scintillator 52 is intense. This intense fluorescent emission will require more time than a fluorescent emission of normal intensity before complete extinction is reached. Let us consider the case wherein the summation value is calculated as the evaluation of the intensity of this intense fluorescent emission. The summation value is calculated through adding together the instantaneous fluorescent intensities for a prescribed number of samples (which, in the explanation in FIG. 18, is 7 samples). This number of samples is determined based on a fluorescent emission of a normal intensity.

The summation value obtained in this way does not accurately represent the intensity of the fluorescent emission. This is because the summation is terminated early when the summation value for an intense fluorescent emission is calculated. The case when calculating the summation value for a strong fluorescent emission is illustrated at the bottom in FIG. 19. Of the instantaneous fluorescent intensities used in calculating the summation value, looking at the last instantaneous fluorescent intensity, this instantaneous fluorescent intensity is correspondingly high, and some time will be required after this until the fluorescent emission completely dies out. However, when the summation value is calculated, the instantaneous fluorescent intensities from that point forward are not taken into consideration. Consequently, the estimation for the summation value for a strong fluorescent emission will be understated.

Moreover, let us assume that the fluorescent emission produced in the scintillator 52 is weak. When compared to a fluorescent emission of a normal intensity, such a weak fluorescent emission will die out quickly. Let us consider a case wherein the summation value is to be calculated to evaluate the intensity of such a weak fluorescent emission. The summation value is calculated through adding together instantaneous fluorescent intensities for the prescribed number of samples (which, in the explanation in FIG. 18, is 7 samples). This number of samples is determined based on a fluorescent emission of a normal intensity.

The summation value obtained in this way does not accurately represent the intensity of the fluorescent emission. This is because instantaneous fluorescent intensities even after the fluorescent emission has already died out are used in the summation. Ideally, the measured values for the fluorescent emissions after the fluorescent emissions have died out will be zero. However, in practice they will be non-zero due to noise components. Thus the calculation of the summation value will be performed through collecting these noise components if the summation of instantaneous fluorescent intensities continues after the fluorescent emission has died out. Consequently, the summation value for the weak fluorescence will be inaccurate, having been greatly influenced by the effects of noise.

As a way to eliminate the problems produced in this way through the number of summation samples being a constant, in fields other than radiation detectors there are analytical devices, and the like, that use a method wherein, when summing pulse signals, a prescribed threshold value is set in advance to determine the starting position and ending position for the summation. However, in these analytical devices, and the like, the purpose for employing this method is to enable handling of pulses of a variety of pulse. In radiation detectors, however, the pulse shapes are essentially constant, where the time interval between pulses is long as well, and thus radiation detectors have been structured wherein the range of time over which summation is performed is constant. However, with these structures, there have been no investigations whatsoever regarding the problem wherein the fluorescent intensity is understated through the summation being terminated early, and the problem wherein noise components are added together, as described above.

The present invention was created in contemplation of this situation, and the object thereof is to provide a radiation detector that enables accurate calculation of summation values regardless of the intensity of the fluorescent emission produced by the scintillator.

Means for Solving the Problem

In order to solve the problems set forth above, the present invention is structured as follows:

That is, the radiation detector according to the present invention comprises: a scintillator for converting radiation into a fluorescent emission; data monitoring portion for continuously outputting instantaneous intensity data indicating the intensity of a fluorescent emission at each time of detection in the course from the production of a fluorescent emission that is produced through incidence of radiation on the scintillator, through decay of the fluorescent emission; and summing portion for calculating a summation value indicating the intensity of the fluorescent emission produced in the scintillator through summing the instantaneous intensity data for fluorescent emission intensities that are greater than a threshold value.

[Operation and Effects]

The radiation detector according to the present invention enables the calculation of the summation value to always be accurate, regardless of the intensity of the fluorescent emission produced in a scintillator. That is, the use of the calculation method for the summation value as set forth in the present invention increases the number of samples of the instantaneous intensity data that are added together, for each occurrence of a fluorescent emission in a scintillator, according to the intensity of the fluorescent emission. This is because the summation of the instantaneous intensity data continues until the fluorescent intensity falls below a threshold value. Through this, the summation of the instantaneous intensity data will be continued until the fluorescent emission has fully died out, even when an intense fluorescent emission is produced in the scintillator, and thus the intensity of a strong fluorescent emission will not be understated. Moreover, the summing portion in the present invention are able to calculate the summation value with high reliability. The instantaneous intensity data that are used in calculating the summation value are those that are at least equal to a threshold value, and thus the signal-to-noise ratio and the reliability will both be adequately high. In the present invention, the instantaneous intensity data that are less than a threshold value wherein the signal-to-noise ratio would be low and the reliability would be low are not used in the summation value.

In the radiation detector set forth above, preferably the threshold value referenced by the summing portion is set so as to be larger the greater the noise component is relative to the signal component in the instantaneous intensity data outputted by the data monitoring portion.

[Operation and Effects]

As described above, setting the threshold value so as to be greater the greater the noise component is relative to the signal component in the instantaneous intensity data that are outputted from the data monitoring portion enables the summation value to be calculated more accurately, even when the noise component in the instantaneous intensity data is large.

Moreover, preferably the radiation detector described above comprises: storing portion for storing a table that associates a summation value that indicates an intensity of a fluorescent emission and a peak value that is a maximum value for the intensity of the fluorescent emission in the course from the production of the fluorescent emission that is produced through incidence of radiation into the scintillator through to the attenuation of the fluorescent emission; peak value acquiring portion for acquiring the peak value based on the instantaneous intensity data outputted by the data monitoring portion; pile-up event evaluating portion for evaluating, based on a time-based change in the instantaneous intensity data, pile-up event that is a phenomenon wherein, in the course of decay of the fluorescent emission produced through incidence of the radiation into the scintillator, radiation is again incident into the scintillator so that the intensity of the fluorescent emission that had been decaying increases again; earlier event estimating portion for estimating, when a pile-up event has been identified, a summation value of the fluorescent emission of the earlier occurrence of two fluorescent emissions that are piled up, through reading out, from the storing portion, the summation value corresponding to the peak value from before the pile-up event, acquired by the peak value acquiring portion; and later event estimating portion for estimating a summation value for the later-occurring fluorescent emission of two fluorescent emissions that are piled up, through subtracting, from the summation value calculated by the summing portion, a summation value estimated by the earlier event estimating portion.

[Operation and Effects]

The radiation detector according to the present invention enables calculation of an accurate summation value even when there is the occurrence of pile-up of the fluorescent emissions. That is, when there are two piled-up fluorescent emissions, the summation value for the fluorescent emission that occurred earlier is estimated based on the peak value of the earlier fluorescent emission, and the summation value for the later fluorescent emission is estimated by subtracting the estimated value for the summation value of the earlier fluorescent emission from the summation value calculated without distinguishing between the two piled-up fluorescent emissions. Because the summation value that is calculated without distinguishing between the two piled-up fluorescent emissions is obtained by the summing portion according to the present invention, it is more accurate than for the conventional method of acquiring the summation value. Consequently, the present invention enables the summation value of the later fluorescent emission to be calculated accurately.

Moreover, preferably in the radiation detector described above, the summation of the values stored in the storing portion are generated based on time-based changes in the intensity of the fluorescent emissions monitored by the data monitoring portion through exposure of the scintillator to radiation in a state wherein no pile-up event occurs.

[Operation and Effects]

The structure described above describes the radiation detector according to the present invention in more detail. If the summation values stored in the storing portion are actual measurements for radiation in a state wherein no pile-up has occurred, then the time-based change in the fluorescent intensity can be estimated more accurately. This is because the time-based change in the fluorescent emission will be disrupted if a pile-up occurs when generating the time constant for the fluorescent emission that is to serve as the standard for estimating the fluorescent intensity of the earlier event.

Moreover, preferably in the radiation detector described above, the summation values stored in the storing portion are calculated by the summing portion.

[Operation and Effects]

The structure described above describes the radiation detector according to the present invention in more detail. The summation value that is stored in the storing portion having been calculated by the summing portion enables the summation value to be estimated more accurately. This enables the summation value for the earlier fluorescent emission to be calculated accurately.

EFFECTS OF THE INVENTION

The radiation detector according to the present invention enables the summation value to always be calculated accurately, regardless of the intensity of the fluorescent emission produced in the scintillator. That is, if the method for calculating the summation value of set forth in the present invention is used, then the number of instantaneous intensity data that are summed together for each fluorescent emission produced by the scintillator will be increased the greater the intensity of the fluorescent emission. This prevents an understated evaluation of the intensity of an intense fluorescent emission. Moreover, the summing portion in the present invention enable a highly reliable summation value to be calculated. This is because the instantaneous intensity data used in calculating the summation value are those that are no less than a threshold value, and thus are those wherein the signal-to-noise ratio and the reliability are adequately high.

BRIEF DESCRIPTION OF THE DRAWINGS

FIG. 14 is a schematic diagram for explaining the operation of the earlier event estimating portion in relation to the second embodiment.

BRIEF DESCRIPTION FO THE EXEMPLARY EMBODIMENTS

[Embodiment 1]

An embodiment of a radiation detector according to the present invention will be described below. A gamma ray is an example of radiation.

<Overall Structure of the Radiation Detector>

Figure 1:
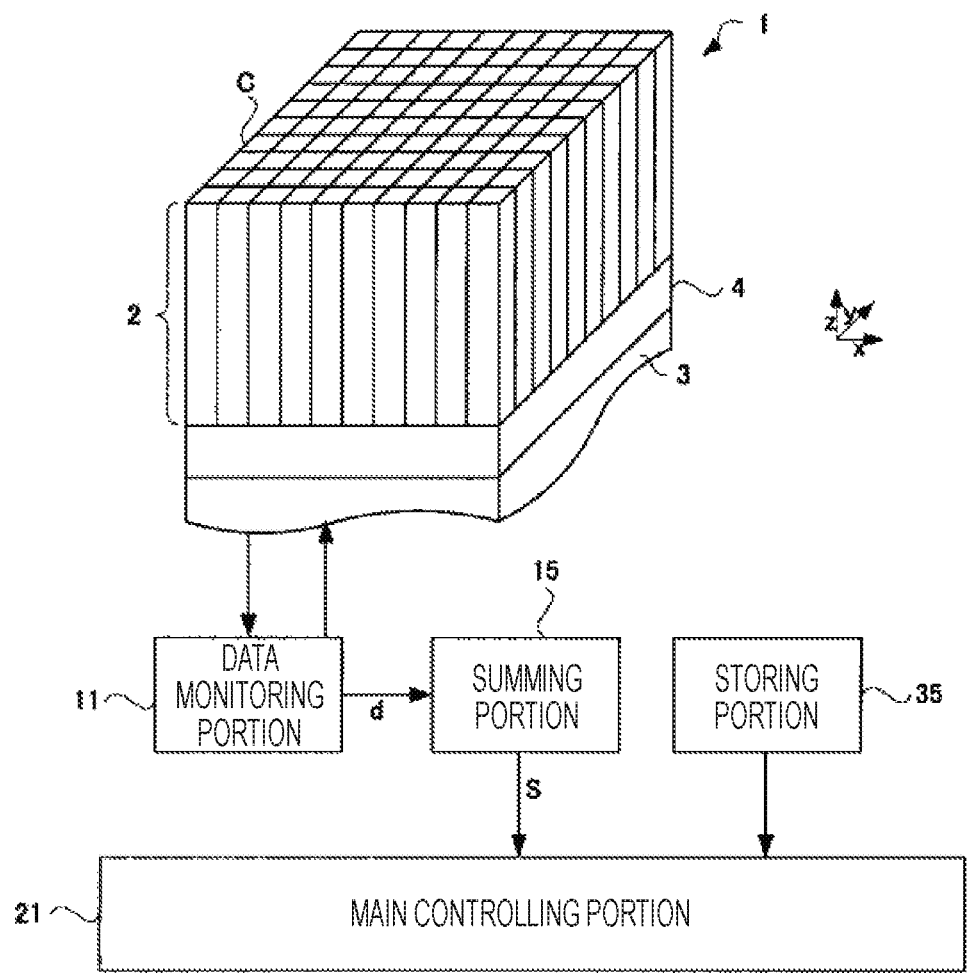
FIG. 1 is a functional block diagram for explaining the overall structure of a radiation detector according to a first embodiment.

As illustrated in FIG. 1, a radiation detector 1 according to a first embodiment is provided with: a scintillator 2 wherein scintillator crystals C are arranged in a matrix; a photodetector 3 for detecting fluorescence produced by the scintillator 2, disposed at the bottom face of the scintillator 2; and a light guide 4 that is disposed at a position interposed between the scintillator 2 and the photodetector 3. Each individual scintillator crystal C is structured from $Lu_{2(1-X)}Y_{2X}SiO_5$ into which Ce has been diffused (hereinafter termed "LYSO"). When radiation is incident into the scintillator 2, the radiation is converted into a fluorescent emission.

The photodetector 3 detects fluorescent emissions produced in the scintillator 2. The photodetector 3 has a position identifying function, able to identify the specific scintillator crystal C that is the origin of a fluorescent emission produced in the scintillator 2. The light guide 4 is provided in order to guide, to the photodetector 3, the fluorescent emissions produced in the scintillator 2. Consequently, the light guide 4 is coupled optically to the scintillator 2 and the photodetector 3.

A data monitoring portion 11 sends a sampling signal, at equal intervals, to the photodetector 3. This sampling signal directs the photodetector 3 to send data, where each time the sampling signal is sent, the photodetector 3 calculates and sends, to the data monitoring portion 11, a fluorescent emission detection signal. The method wherein the occurrence of fluorescent emissions is monitored at constant time intervals, regardless of whether or not the photodetector 3 has detected a fluorescent emission, is known as the "free-run method." The data monitoring portion 11 monitors the instantaneous intensity data d using the free-run method. The data monitoring portion 11 continuously outputs instantaneous intensity data d indicating the intensity of fluorescent emissions at individual detection times. The data monitoring portion 11 corresponds to the data monitoring portion in the present disclosure.

The fluorescent emission detection signal outputted by the photodetector 3 (the output data) is, itself, analog data. When the data monitoring portion 11 acquires the output data from the photodetector 3, it digitizes the data to produce an instantaneous intensity datum d that indicates the intensity of the fluorescent emission. The instantaneous intensity data d are generated as a time series based on the output data of the photodetector 3 that are inputted sequentially into the data monitoring portion 11. Consequently, the data monitoring portion 11 monitors, as time elapses, the instantaneous intensity data d. The instantaneous intensity data d that are outputted by the data monitoring portion 11 indicate the instantaneous intensities of emissions produced by the scintillator at given points in time. This instantaneous intensity data d are necessary in evaluating the intensities of the fluorescent emissions that are produced by the scintillator 2.

Figure 2:
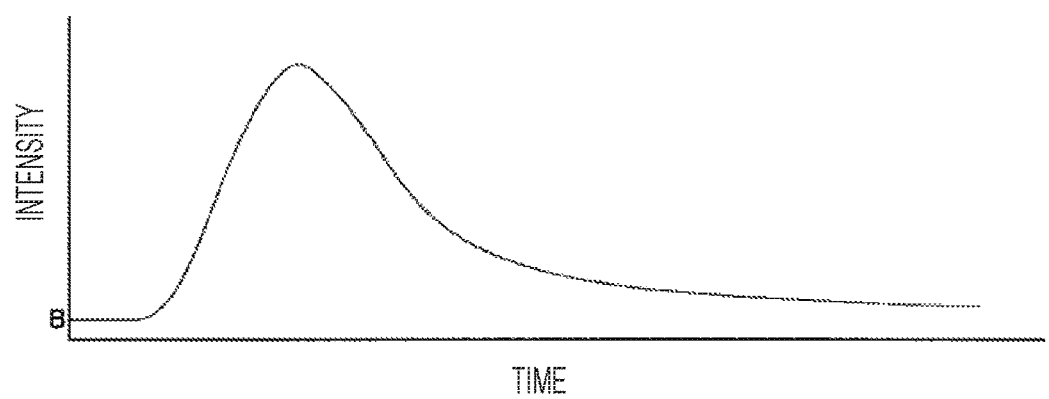
FIG. 2 is a schematic diagram for explaining a fluorescent emission that occurs in a scintillator in relation to the first embodiment.

The instantaneous intensity data d cannot be used as-is in evaluating the intensity of the fluorescent emission of the scintillator 2. The reason for this will be explained below. FIG. 2 shows how the intensity of light time-based change when a fluorescent emission is produced in the scintillator 2. When a single γ-ray photon is incident into the scintillator 2, it is converted into a fluorescent emission by the scintillator 2. The form of the light emitted in the fluorescent emission has a temporal width. That is, when a fluorescent emission is produced, the scintillator emits light that becomes steadily brighter, after which the emission of light decays as time elapses. In this way, when a fluorescent emission is produced in the scintillator 2, some time is required before the emission of light by the scintillator 2 dies out. Note that B in FIG. 2 indicates the base state, which is the intensity of light emission prior to the commencement of emission of light by the scintillator 2. Preferably the fluorescent intensity is zero when the instantaneous intensity data d is in this base state, but, in practice, it will be non-zero due to the effects of noise.

Because the fluorescent emission that is produced in the scintillator 2 has a temporal width, some innovation is required in evaluating the intensity of the fluorescent emission that occurs in the scintillator 2. That is, the instantaneous intensity data d that is outputted by the data monitoring portion 11 is nothing more than an indication, at a given time, of the instantaneous intensity of the light produced in the scintillator. Consequently, the instantaneous intensity data d that are outputted by the data monitoring portion 11 while light is being emitted by the scintillator 2 through a fluorescent emission may have been measured at a time wherein the fluorescent emission was still growing stronger. Conversely, an instantaneous intensity datum d may be a measurement at a time when the fluorescent emission is decaying. In this way, the intensity of a fluorescent emission that is produced within the scintillator 2 cannot be evaluated from a single instantaneous intensity datum d alone.

Given this, the radiation detector 1 sums the instantaneous intensity data d that are outputted over time, to calculate a summation value S. This summation value S is that which is produced by adding together a plurality of instantaneous intensity data d measured during the course over which a single fluorescent emission is produced, grows stronger, reaches a maximum, and then gradually decays. The calculation of such a summation value S is carried out by a summing portion 15. The summing portion 15 is sent, over time, instantaneous intensity data d from the data monitoring portion 11. The summing portion 15 produces a summation value S by adding together some of these instantaneous intensity data d. The summing portion 15 corresponds to the summing portion at in the present disclosure.

Figure 3:
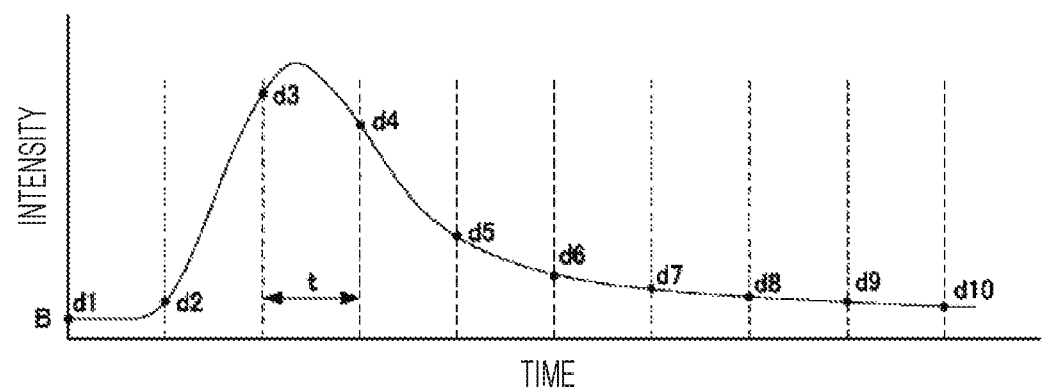
FIG. 3 is a schematic diagram for explaining the instantaneous intensity data in relation to the first embodiment.

FIG. 3 illustrates the relationship between the instantaneous intensity data d that is outputted, and time, when a fluorescent emission is produced in the scintillator 2. Each time a prescribed time interval t elapses, instantaneous intensity data d is acquired by the data monitoring portion 11 and sent to the summing portion 15.

<Distinctive Structures in the Present Invention>

The present invention is characterized through the summing portion 15 varying the number of instantaneous intensity data d that are added together, each time the summation value S is calculated. That is, the number of instantaneous intensity data d used by the summing portion 15 to calculate the summation value S when a fluorescent emission is produced in the scintillator 2 is not necessarily the same as the number of instantaneous intensity data d used by the summing portion 15 in calculating the summation value S the next time a fluorescent emission is produced in the scintillator 2. The reliability of the summation value S can be increased by changing the instantaneous intensity data d that are added together, in this way.

The evaluation as to whether or not to include, in the summation, an instantaneous intensity datum d when the summing portion 15 is calculating a summation value S is an evaluation based on a threshold value a. That is, of the instantaneous intensity data d, those wherein the intensities are less than the threshold value a are discarded by the summing portion 15, and not used in calculating the summation value S. Additionally, of the instantaneous intensity data d, those wherein the intensity is equal to or greater than the threshold value a are used in calculating the summation value S.

As the actual operation carried out by the summing portion 15, nothing is performed, and the summing portion of 15 remains in a standby state, as long as the instantaneous intensity data d outputted by the data monitoring portion 11 remain in a state wherein they are less than the threshold value a, where the calculation of the summation value S commences when an instantaneous intensity datum d becomes equal to or greater than the threshold value a, where the instantaneous intensity data d are sequentially added together from that point forward. Moreover, when the instantaneous intensity data d no longer satisfy the threshold value a, the instantaneous intensity data d that are less than the threshold value a are not summed together, but rather the calculation of the summation value S is terminated at that point.

Figure 4:
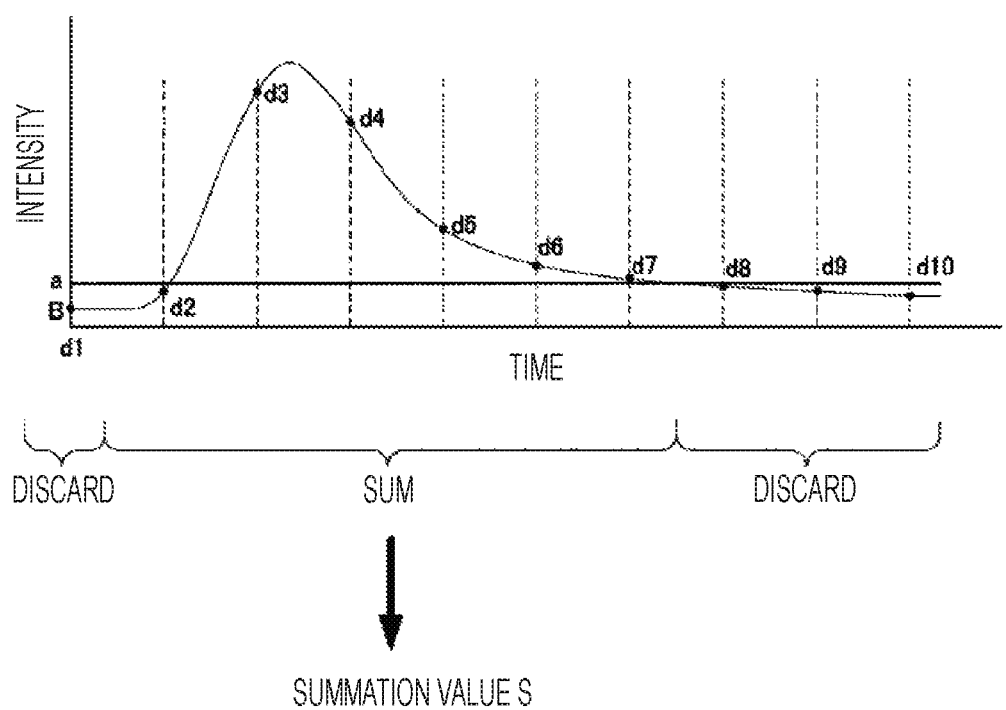
FIG. 4 is a schematic diagram for explaining the operation of the summing portion in relation to the first embodiment.

In FIG. 4, the instantaneous intensity data d that are equal to or greater than the threshold value a are the instantaneous intensity data d3 through d7. Consequently, the summing portion 15, in the FIG. 4, discards the instantaneous intensity data d1, d2, d8, d9, and d10, which are less than the threshold value a, and adds together the instantaneous intensity data d3 through d7, which are equal to or greater than the threshold value a. That which is obtained by summing together in this way is the summation value S. In this way, the summing portion 15 sums the instantaneous intensity data d wherein the fluorescent intensity is at least the threshold value a, to calculate the summation value S that indicates the intensity of the fluorescent emission that has occurred in the scintillator 2.

The number of instantaneous intensity data d that are added together by such a summing portion 15 will change depending on the intensity of the fluorescent emission produced in the scintillator 2, and such an occurrence will be explained next.

<When the Fluorescent Emission Produced in the Scintillator 2 is Intense>

Figure 5:
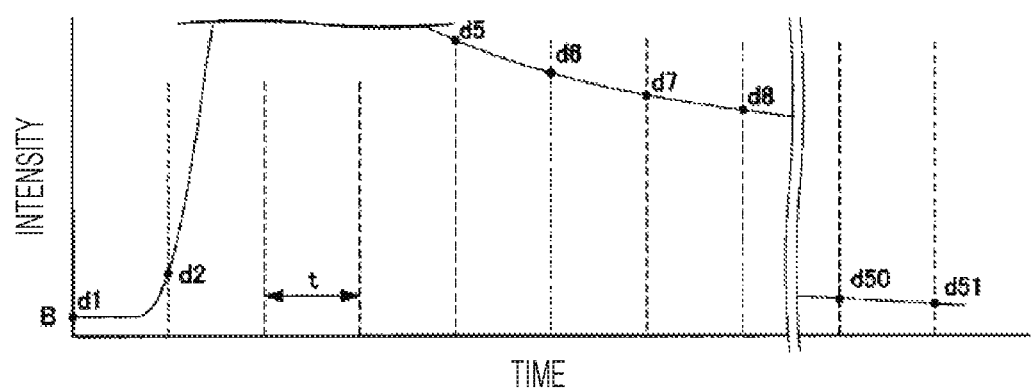
FIG. 5 is a schematic diagram for explaining the instantaneous intensity data in relation to the first embodiment.
Figure 6:
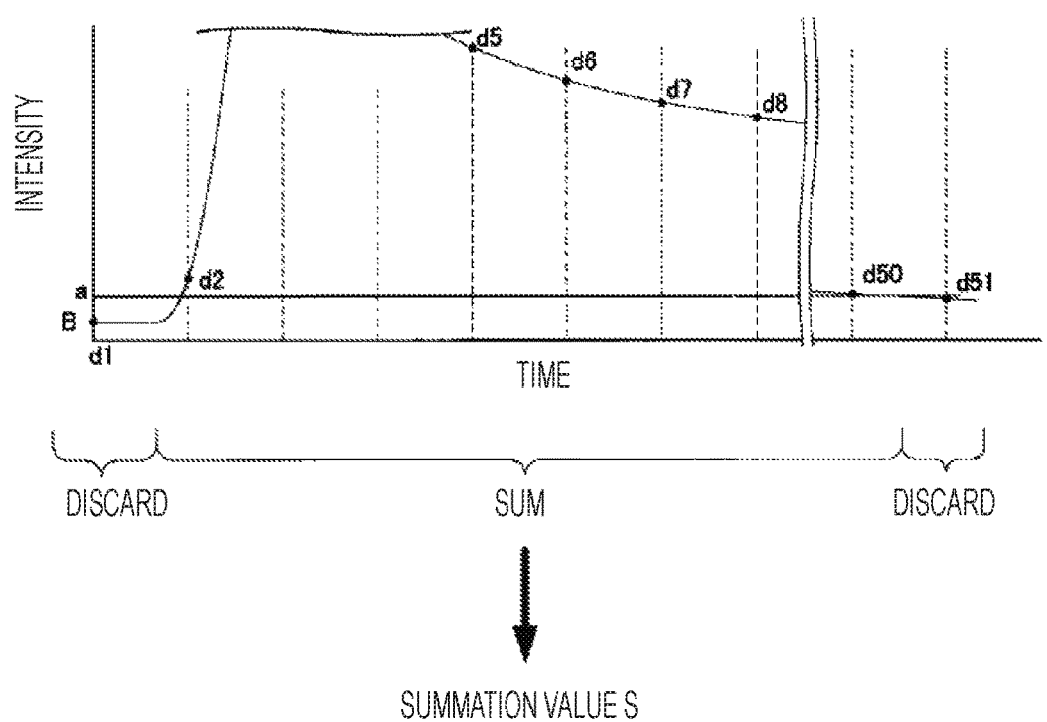
FIG. 6 is a schematic diagram for explaining the operation of the summing portion in relation to the first embodiment.

FIG. 5 shows a case wherein the fluorescent emission produced in the scintillator 2 is more intense. When such a fluorescent emission is produced in the scintillator 2, the extinction thereof will require a longer time. FIG. 6 is for explaining the operation of the summing portion 15 in such a case. In FIG. 6, the instantaneous intensity data d that are equal to or greater than the threshold value a are the instantaneous intensity data d2 through d50. Consequently, in FIG. 6 the summing portion 15 will discard the instantaneous intensity data d1 and d51, which are less than the threshold value a, and will sum together the instantaneous intensity data d2 through d50, which are equal to or greater than the threshold value a. That which is produced through such a summation is the summation value S. In this way, when the fluorescent emission produced in the scintillator 2 is intense, then the number of instantaneous intensity data d that are equal to or greater than the threshold value a will increase commensurately, increasing the number of instantaneous intensity data d that are used when calculating the summation value S.

In this case, the summing portion 15 calculates the summation value S by summing together all of the instantaneous intensity data d wherein the signal-to-noise ratio is adequately high. Adding together the instantaneous intensity data d used in the calculation in this case contributes to greater accuracy of the summation value S. When an intense fluorescent emission is produced, as in FIG. 5, some time is required for the fluorescent emission to die out. The summing portion 15 is structured so as to use, in the calculation of the summation value S, all of the valid instantaneous intensity data d, even in such an event. Consequently, the summing portion 15 is able to calculate an accurate summation value S.

<When the Fluorescent Emission Produced in the Scintillator 2 is Weak>

Figure 7:
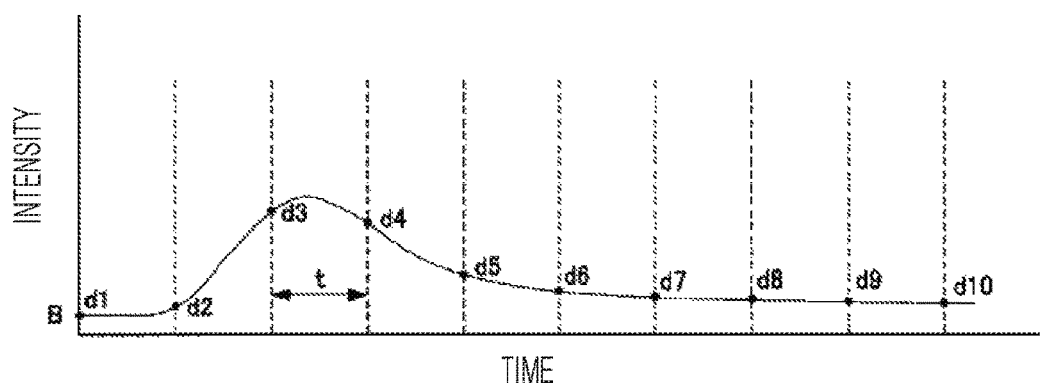
FIG. 7 is a schematic diagram for explaining the instantaneous intensity data in relation to the first embodiment.
Figure 8:
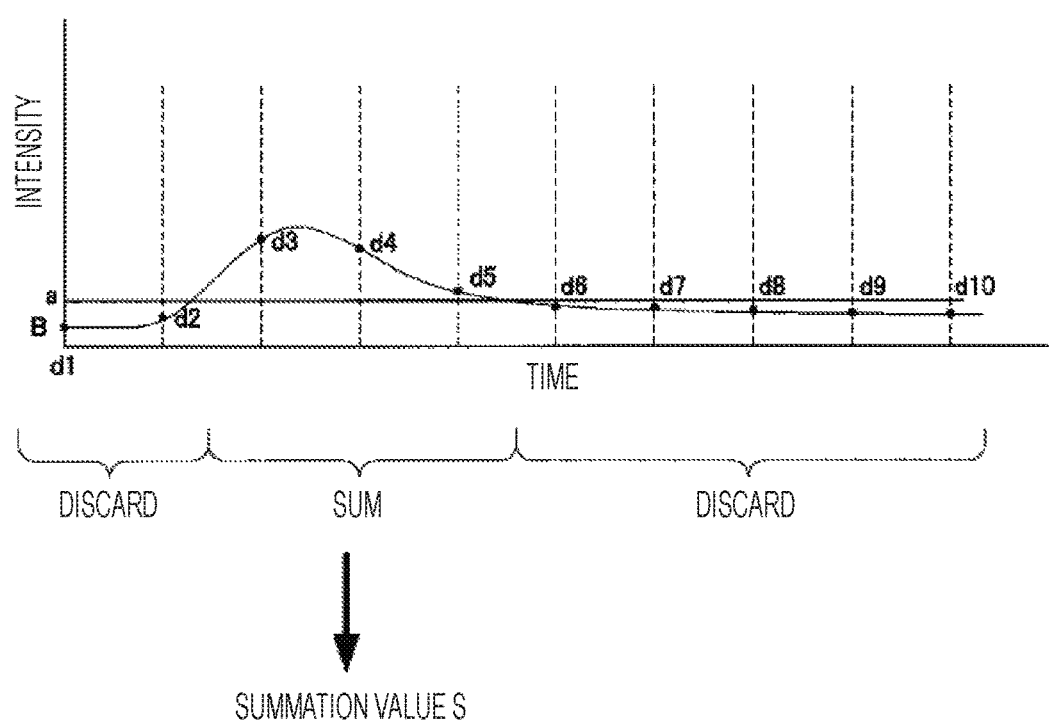
FIG. 8 is a schematic diagram for explaining the operation of the summing portion in relation to the first embodiment.

FIG. 7 illustrates a case wherein the fluorescent emission produced in the scintillator 2 is weaker. When produced in the scintillator 2, extinction occurs more quickly. FIG. 8 explains the operation of the summing portion 15 in such a case. In FIG. 8, the instantaneous intensity data d that are equal to or greater than the threshold value a are the instantaneous intensity data d3 through d5. Consequently, in FIG. 6, the summing portion 15 discards the instantaneous intensity data d1, d2, and d6 through d10, which are less than the threshold value a, and sums together the instantaneous intensity data d3 through d5, which are equal to or greater than the threshold value. That which is produced through summing in this way is the summation value S. In this way, the weaker the fluorescent emission produced by the scintillator 2, the fewer the number of instantaneous intensity data d that are equal to or greater than the threshold value a, and thus the fewer the instantaneous intensity data d that are used when calculating the summation value S.

In this case, the summing portion 15 calculates the summation value S without adding together the instantaneous intensity data d wherein the signal-to-noise ratio is too low. When a weak fluorescent emission is produced, as in FIG. 7, the fluorescent emission dies out immediately. The summing portion 15 is structured so as to not use, in the calculation of the summation value S, those instantaneous intensity data d that are invalid because the signal-to-noise ratio is too low, even in such a case. Consequently, the summing portion 15 is able to calculate an accurate summation value S.

The fact that the instantaneous intensity data d that are less than the threshold value a are invalid will be explained next. The threshold value a indicates the reliability of the instantaneous intensity data d. If an instantaneous intensity datum d is less than the threshold value a, this indicates that the signal-to-noise ratio for the instantaneous intensity datum d is too low. Such an instantaneous intensity datum d includes both a slight signal component and a noise component that is large in relation thereto. When instantaneous intensity data d wherein the proportions of the noise components, relative to the signal components, are large, such as this, are added together in the summation value S, then both the insignificant signal components and the noise components that are large in relation thereto are included in the summation value S. With such instantaneous intensity data d, it is in not including these instantaneous intensity data d in the summation value S that there is a benefit in calculating an accurate summation value S. Given this, the summing portion 15 is structured so as to not sum, into the summation value S, those instantaneous intensity data d that are less than the threshold value a.

Consequently, when, depending on the situation wherein the radiation is detected, there is increased noise included in the instantaneous intensity data d that is outputted by the data monitoring portion 11, the threshold value a is set so as to be higher. Doing this enables a reliable and accurate summation value S to be calculated, through reliably rejecting those instantaneous intensity data d wherein the signal-to-noise ratio is too low, when the noise component that is outputted from the data monitoring portion 11 has become large. The threshold value a that is referenced by the summing portion 15 is set so as to be larger the greater the noise component, relative to the signal component, in the instantaneous intensity data d that are outputted by the data monitoring portion 11.

<Other Structures of the Radiation Detector>

The radiation detector 1 comprises a main controlling portion 21 for carrying out the overall control of the various portions. This main controlling portion 21 is structured from a CPU, and achieves the various portions 11 and 15 through executing the various types of programs. Note that each of these portions, described above, may instead be embodied divided into control devices for each. Moreover, the storing portion 35 stores all threshold values, tables, and the like that relate to control of the radiation detector 1. The storing portion 35 corresponds to the storing portion in the present disclosure.

As described above, the radiation detector 1 according to the present invention enables the summation value S to always be calculated accurately, regardless of the intensity of the fluorescent emission produced in the scintillator 2. That is, when the method for calculating the summation value S as in the present invention is used, the number of instantaneous intensity data d that are added together, for each fluorescent emission produced within the scintillator 2, will be larger the more intense the fluorescent emission. This is because the summing of the instantaneous intensity data d will continue until the fluorescent intensity falls below the threshold value. When this is done, the summing of the instantaneous intensity data d will continue up until the fluorescent emission has become fully extinct, even when an intense fluorescent emission has been produced in the scintillator 2, and thus the intensity of an intense fluorescent emission will not be understated.

Moreover, the summing portion 15 in the present invention is able to calculate the summation value S with high reliability. This is because the instantaneous intensity data d that are used to calculate the summation value S are those that are equal to or greater than the threshold value, and so have adequately high signal-to-noise ratios and high reliability as well. In the present invention, those instantaneous intensity data d that are less than the threshold value, which have low signal-to-noise ratios and low reliability, are not used in calculating the summation value S.

As described above, setting the threshold value higher with an increase in the noise component, relative to the signal component, in the instantaneous intensity data d that is outputted by the data monitoring portion 11 enables a more accurate summation value S to be calculated even when there is an increase in the noise component in the instantaneous intensity data d.

[Embodiment 2]

Figure 9:
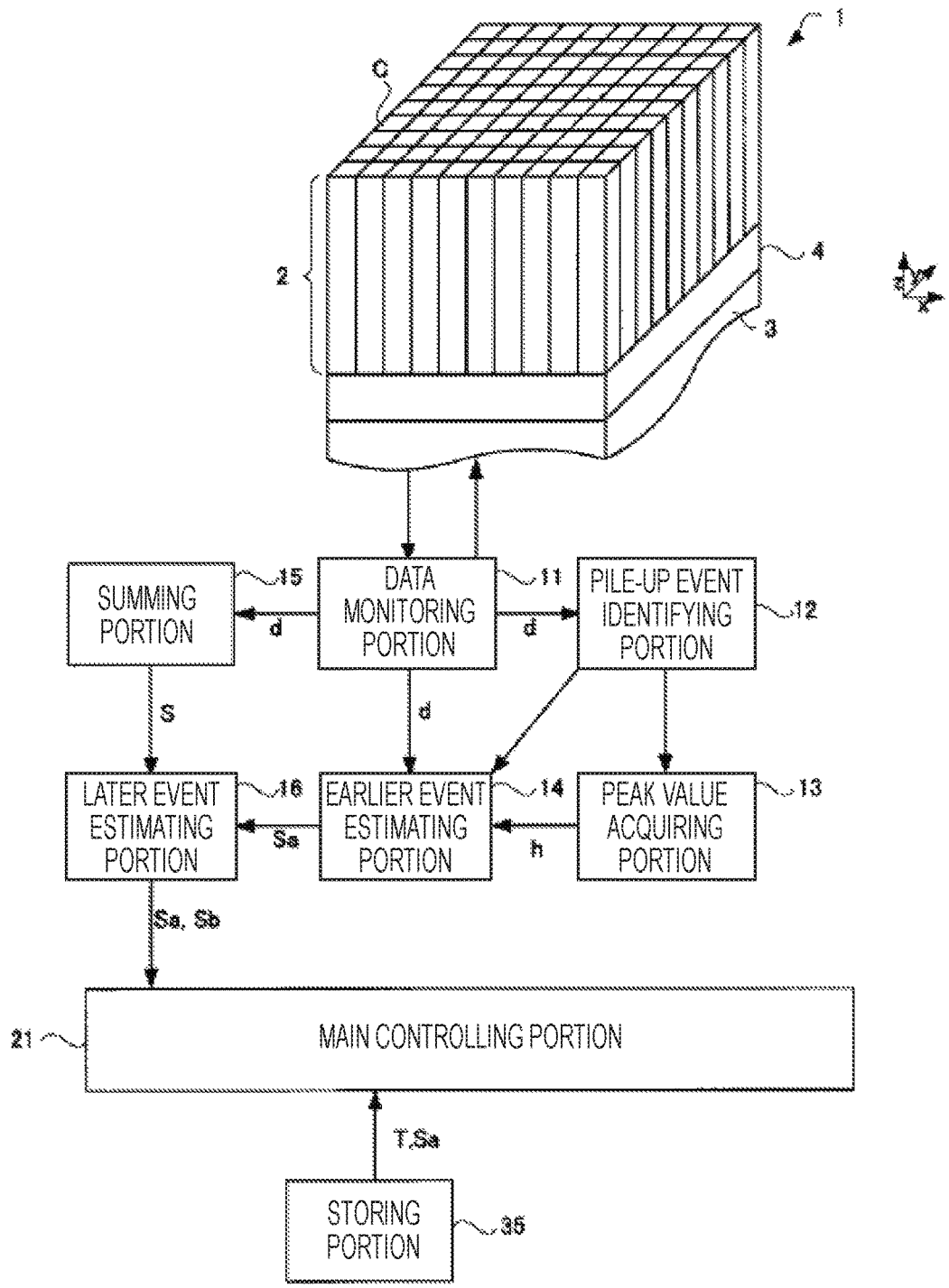
FIG. 9 is a functional block diagram for explaining the overall structure of a radiation detector according to a second embodiment.

A radiation detector according to a second embodiment will be explained next. The radiation detector according to the second embodiment, as illustrated in FIG. 9, is structured similarly to the radiation detector explained in the first embodiment, but the point that it comprises also a pile-up event identifying portion 12, a peak value acquiring portion 13, an earlier event estimating portion 14, and a later event estimating portion 16 is different from the radiation detector in the first embodiment. These various portions 12, 13, and 14 are a structure that is provided in contemplation of "pile-up," which is a phenomenon wherein fluorescent emissions overlap. The pile-up event identifying portion 12 corresponds to the pile-up event evaluating portion in the present disclosure, and the peak value acquiring portion 13 corresponds to the peak value acquiring portion in the present disclosure. The earlier event estimating portion 14 corresponds to the earlier event estimating portion in the present disclosure, and the later event estimating portion 16 corresponds to the later event estimating portion in the present disclosure.

The main controlling portion 21 in the second embodiment is structured from a CPU, and the various portions 11, 12, 13, 14, 15, and 16 are achieved through execution of various types of programs. Note that the various portions described above may instead be achieved divided into respective control devices.

<Fluorescent Emission Pile-Up>

Figure 10:
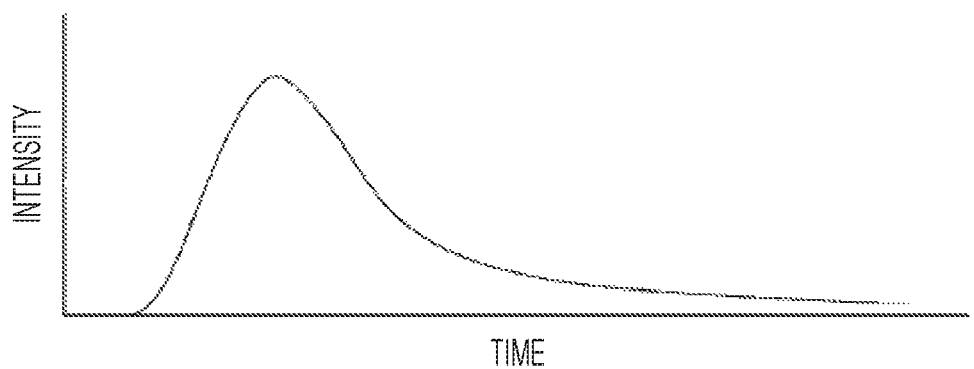
FIG. 10 is a schematic diagram for explaining pile-up fluorescent emissions in relation to the second embodiment.

Prior to explaining the operations of the various portions 12, 13, and 14, fluorescent emission pile-up will be explained first. FIG. 10 illustrates the time-based change in the instantaneous intensity data d detected by the radiation detector 1 for a single radiation event. When the radiation is incident into the scintillator 2, the intensity of the fluorescent emission increases to reach a maximum, as illustrated in FIG. 10. After this, the intensity of the fluorescent emission gradually decays over a time interval that is longer than the time interval over which the intensity of the fluorescent emission rose.

Figure 11:
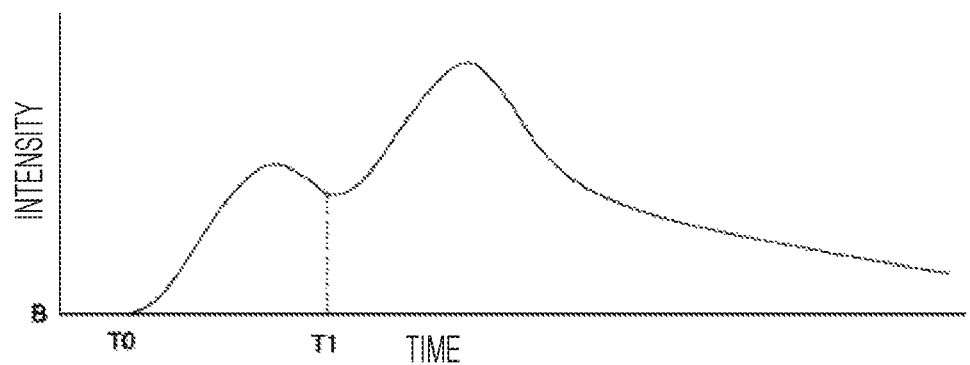
FIG. 11 is a schematic diagram for explaining pile-up fluorescent emissions in relation to the second embodiment.

FIG. 11 illustrates the time-based change in the instantaneous intensity data d when a double radiation event is detected by the radiation detector 1. First, when the first radiation is incident into the scintillator 2, the fluorescent intensity rises, as was explained using FIG. 10. Given this, the fluorescent intensity illustrated in FIG. 11 exhibits the same behavior as in FIG. 10 during the interval from time T0, wherein the fluorescent emission commenced, until time T1. Here let us assume that, at time T1, radiation is again incident into the scintillator 2. That is, before the fluorescent emission has fully decayed, radiation is incident into the scintillator 2 a second time. When this occurs, as illustrated in FIG. 11, the intensity of the fluorescent emission which should have decayed in this way, rises again at time T1.

The phenomenon wherein, during the course of the decay of the fluorescent emission that has been produced in this way through radiation that is incident into the scintillator 2, radiation is again incident into the scintillator 2 so that the intensity of the fluorescent emission that had been decaying increases again is known as "fluorescent pile-up." That is, fluorescent pile-up occurs when radiation is incident twice into the scintillator 2 in a short time interval. Consequently, it is not termed "pile-up" if, after a fluorescent emission in the scintillator 2 has become fully extinct, a subsequent fluorescent emission is produced within the scintillator 2.

When such a pile-up is produced, this disrupts the instantaneous intensity data d that is outputted by the data monitoring portion 11. It is necessary to eliminate this disruption in order to detect radiation accurately. Given this, the structure in the second embodiment is provided with a structure for separating two piled-up, overlapping, fluorescent emissions. That which achieves this is the various portions 12, 13, and 14 that are provided in the radiation detector 1 of the second embodiment. The operation thereof will be explained sequentially below.

<Operation of the Pile-up Event Identifying Portion 12>

The pile-up event identifying portion 12 evaluates a fluorescent pile-up event based on time-based change in the instantaneous intensity data d. The specific operations thereof will be explained below. The instantaneous intensity data d are sent successively from the data monitoring portion 11 to the pile-up event identifying portion 12. This enables the pile-up event identifying portion 12 to identify time-based change in the instantaneous intensity data d.

A threshold value n is used in the operation of the pile-up event identifying portion 12. This threshold value n is a set point that is stored in a storing portion 35, where the pile-up event identifying portion 12 operates by reading out, from the storing portion 35, data indicating the threshold value n. The storing portion 35 corresponds to the storing portion in the present disclosure.

Figure 12:
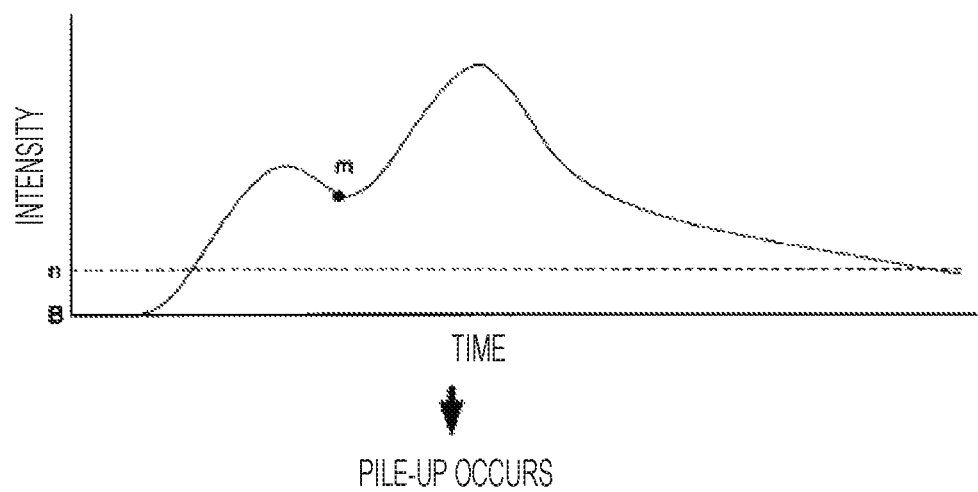
FIG. 12 is a schematic diagram for explaining the operation of a pile-up event identifying portion in relation to the second embodiment.

FIG. 12 illustrates the operation of the pile-up event identifying portion 12. The pile-up event identifying portion 12 acquires the intensity, and the derivative value of the intensity, for each of the instantaneous intensity data d outputted from the data monitoring portion 11. Given this, when a specific condition is satisfied, the pile-up event identifying portion 12 identifies that there has been a fluorescent pile-up, as explained using FIG. 11. The condition is whether or not the minimum value for the time-based change in the instantaneous intensity data d is at least equal to the threshold value n. Specifically, if the minimum value goes to the threshold value n, then it is identified that a pile-up event has occurred.

If such a condition is set, then it becomes possible to identify accurately the occurrence of a pile-up. First, the intensity being at a minimum indicates that a fluorescent emission that had been weak has, part way through, become strong. This indicates incidents of radiation into the scintillator 2, divided into two parts. More correctly, it can be said that radiation has been incident into the scintillator 2 twice, before and after the time at which the intensity was at a minimum.

Even if radiation has been incident twice into the scintillator 2, this does not necessarily mean that a pile-up has occurred. This is because the radiation may have been incident into the scintillator 2 after the fluorescent emission has reached a state of full extinction. In such a case, considering this to be separate radiation detection events, as illustrated in FIG. 10, would be more correct.

Given this, the pile-up event identifying portion 12 identifies a pile-up based on whether or not the minimum value is at least equal to a threshold value n. If the minimum value is equal to or greater than the threshold value n, then it can be understood that radiation has been incident into the scintillator 2 in a state wherein the fluorescent emission has not yet fully decayed. This is because fluorescent emissions decay while becoming gradually weaker. This threshold value n is a parameter that is essential in identifying pile-up, and can be adjusted as appropriate in accordance with the circumstances in which radiation is to be detected.

The operation of the pile-up event identifying portion 12 will be explained for a case wherein the instantaneous intensity data d has changed over time as in FIG. 12. The pile-up event identifying portion 12 identifies the existence of a minimum m in the time-based change of the instantaneous intensity data d, and, additionally, the pile-up event identifying portion 12 considers whether or not the minimum value at this minimum m is at least equal to the threshold value n. Consequently, in such a case, the pile-up event identifying portion 12 identifies that a pile-up has occurred around the time wherein the minimum m was produced. The pile-up event identifying portion 12 evaluates, based in the change in the instantaneous intensity data d over time, the occurrence of a pile-up, which is a phenomenon wherein, during the course of the fluorescent emission that was produced through the incidence of radiation into the scintillator 2 decaying, radiation is again incident into the scintillator 2, causing the intensity of the fluorescence, which had been decaying, to increase in intensity again.

<Operation of the Peak Value Acquiring Portion 13>

When the pile-up event identifying portion 12 has identified a pile-up event, it provides notification thereof to the peak value acquiring portion 13. The peak value acquiring portion 13 acquires the peak value based on the instantaneous intensity data d outputted by the data monitoring portion 11. The peak value is the maximum value for the intensity of the fluorescence in the course of decay after the production of fluorescence that is produced through incidents of radiation into the scintillator 2. The peak value acquiring portion 13 corresponds to the peak value acquiring portion in the present disclosure.

Figure 13:
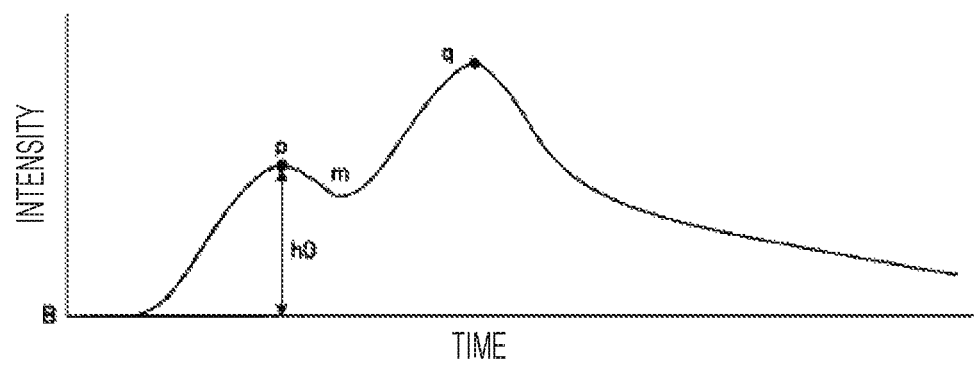
FIG. 13 is a schematic diagram for explaining the operation of a peak value of acquiring portion in relation to the second embodiment.

The specific operations of the peak value acquiring portion 13 will be explained next. The peak value acquiring portion 13 is sent, as time elapses, the instantaneous intensity data d from the data monitoring portion 11. Given this, when the pile-up event identifying portion 12 identifies a pile-up event, a signal providing notification thereof, and data indicating the time at which the minimum m, which is to be referenced in identifying a pile-up, are sent to the peak value acquiring portion 13. When this signal and data are sent from the pile-up event identifying portion 12 to the peak value acquiring portion 13, first, as illustrated in FIG. 13, the maximum p that appeared prior to the time at which the minimum m occurred is determined. This maximum p matches the maximum that first occurs when viewing the instantaneous intensity data d going backward in time from the time at which the minimum m occurred. Consequently, a maximum q, which is related to the fluorescent emission of the later event that is illustrated in FIG. 13, is not identified as the maximum point by the peak value acquiring portion 13, because it appears after the time at which the minimum m is produced.

Given this, the peak value acquiring portion 13 acquires the maximum value, which is the intensity at the maximum p, and identifies this as the peak value h0. In this way, the peak value that is acquired by the peak value acquiring portion 13 is the peak value for the radiation that was the earlier incidence of the two incidences of radiation into the scintillator 2. That is, the peak value acquiring portion 13 acquires the peak value that is immediately prior to the pile-up event.

<The Tables>

Prior to explaining the operation of the earlier event estimating portion 14, the table T that is used in the earlier event estimating portion 14 will be explained first. This table T is stored in the storing portion 35, and is read out, as appropriate, from the storing portion 35 by the earlier event estimating portion 14. FIG. 14 shows the table T schematically. The table T is a table of correspondence between peak values h having different values and the summation values Sa corresponding thereto. This table T is provided for the purpose of estimating the time-based changes in the fluorescent emissions produced in the scintillator 2. The storing portion 35 stores a table T wherein peak values, which are the maximum values for the intensities of fluorescent emissions in the course from the production of the fluorescent emission that is produced through the incidence of radiation into the scintillator 2 through decay thereof, in association with summation values S that indicates the intensities of the fluorescent emissions.

Figure 15:
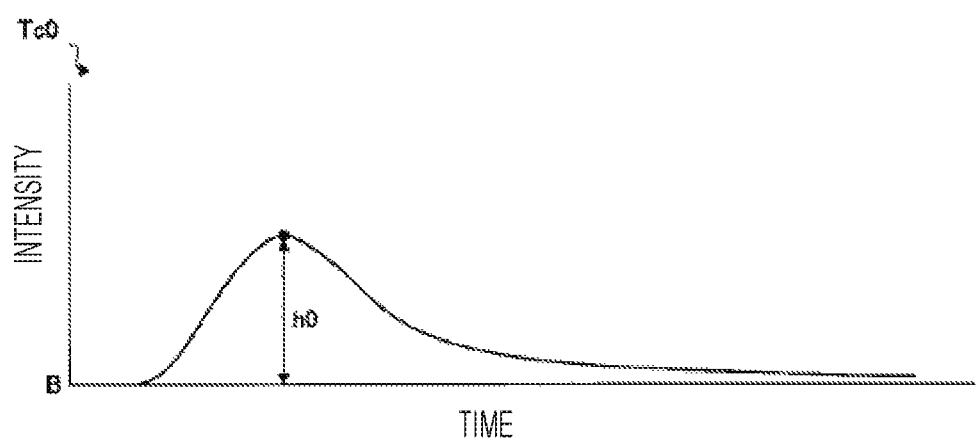
FIG. 15 is a schematic diagram for explaining the operation of the earlier event estimating portion in relation to the second embodiment.

FIG. 15 explains the peak values h0 and the summation values Sa associated therewith. The summation values Sa are structured based on the measured values when there is a single incidence of radiation detected in the radiation detector 1. That is, a summation value Sa indicates the detection result when the radiation detector 1 has detected radiation in a state wherein there is no fluorescent pile-up. This summation value Sa is calculated by the method explained using FIG. 4.

If the intensities of the fluorescent emissions produced in the scintillator 2 were always constant, then it would be easy to estimate the state of attenuation of the fluorescent emission. This is because the fluorescent emissions produced in the scintillator 2 should always have time-based change following the same curve. However, in practice the fluorescent emissions produced in the scintillator 2 may be intense emissions or weak emissions. The form of decay of the fluorescent emissions will vary depending on the intensity of the fluorescent emission. Given this, structuring according to this second embodiment is for the purpose of estimating accurately the time-based change in a fluorescent emission produced in the scintillator 2, to prepare a plurality of summation values Sa that depend on the fluorescent intensities.

In this case, the peak value can be used as an index for the intensity of the fluorescent emission. That is, when, in the time-based change of the fluorescent emission, the peak value is large, it can be understood that this time-based change is for an intense fluorescent emission, and if the peak value in the time-based change of the fluorescent emission is small, then it can be understood that this time-based change is for a weak fluorescent emission. In this way, if peak values are identical, then the time-based changes in the fluorescent emissions will be known. Consequently, if the peak value can be known, then it would be possible to estimate the summation value for the fluorescent emission produced by the scintillator 2.

FIG. 15 is for explaining peak values h0 and time constants Tc0 for the fluorescent emissions corresponding thereto. The summation value S0 is calculated based on the time constant Tc0. Note to that summation values Sa1, Sa2, and Sa3, calculated based on the respective corresponding time constants Tc1, Tc2, and Tc3 are associated respectively, with the individual peak values h1, h2, and h3 in table T (referencing FIG. 14).

Consequently, the structure in the second embodiment requires the preparation of the table T prior to radiation detection. A method for generating this table T will be explained next. The table T can be produced through detecting radiation using a radiation detector 1 structured identically to the structure explained using FIG. 1. In this case, detection of radiation is carried out with the radiation doses small enough so that fluorescent pile-up will not occur. When the radiation is detected continuously, fluorescent emissions of a variety of intensities will be detected. Table T is produced through monitoring the time-based changes in the instantaneous intensity data d of the respective fluorescent emissions in the same way as for the operation of the data monitoring portion 11, described above, and sending the results to the peak value acquiring portion 13, to acquire the peak values. In the actual table T, the summation values Sa are listed sequentially depending on the magnitude of the peak value.

The summation value Sa stored in the storing portion 35 is calculated by the summing portion 15. That is, the summation value Sa is calculated through adding together only those instantaneous intensity data d that are above the threshold value a, in the same manner as explained in FIG. 4. As a result, this summation value Sa has high reliability when compared to the conventional calculating method.

Moreover, when generating the table T, an approach may also be used wherein the instantaneous intensity data d obtained when fluorescent pile-up has occurred will not be used in generating the table T. In this case, the pile-up event evaluation is carried out by the pile-up event identifying portion 12. In any event, the time constant Tc for the fluorescent intensity based on the summation values Sa stored in the storing portion 35 will be for the time-based change of the intensity of the fluorescent emission monitored by the data monitoring portion 11 through the exposure of the scintillator 2 to radiation in a state wherein there are no occurrences of pile-up. A state wherein there are no occurrences of pile-up can be achieved through adequately reducing the radiation dose of the radiation produced by the radiation source.

When generating the table T, generating the table T using a detector of the same structure as the radiation detector 1 that will actually be used in detecting makes it possible to estimate the time-based changes of the fluorescent emissions more accurately. The time-based changes of the instantaneous intensity data d when detecting fluorescent emissions will vary depending on the structure of the radiation detecting device. Consequently, if the structure of the radiation detecting device is different, then the time-based changes of the instantaneous intensity data d that are outputted will be different even if the fluorescent emissions produced by the scintillator 2 are identical. In the structure in the second embodiment, the table T is generated through detecting the radiation using identical parameters as the parameters for the actual radiation detection, enabling the summation values Sa that indicate the intensities of the fluorescent emissions to be estimated accurately.

<Operation of the Earlier Event Estimating Portion 14>

When the pile-up event identifying portion 12 has identified an occurrence of pile-up, the peak value acquiring portion 13 sends the peak value h0 to the earlier event estimating portion 14. The earlier event estimating portion 14, when a pile-up event has been identified, reads out, from the storing portion 35, the summation value Sa0 corresponding to the peak value h0, by referencing the table T. This summation value Sa0 indicates the intensity of the fluorescent emissions for the radiation that was incident in the earlier of the two radiation events. When the occurrence of pile-up has been identified, the earlier event estimating portion 14 estimates the summation value for the fluorescent emission that occurred first, of the two fluorescent emissions that are piled up, through reading out, from the storing portion 35, the summation value Sa0 that corresponds to the peak value h0 from prior to the pile-up event, acquired by the peak value acquiring portion 13.

<Operation of the Summing Portion 15>

The intensity of the fluorescent emission for the radiation that was incident later is calculated by the summing portion 15, and the operation thereof will be explained next. The data monitoring portion 11 sends the instantaneous intensity data d to not only the pile-up event identifying portion 12 and the earlier event estimating portion 14, but to the summing portion 15 as well. As the actual operation carried out by the summing portion 15, nothing is performed, and the summing portion of 15 remains in a standby state, as long as the instantaneous intensity data d outputted by the data monitoring portion 11 remain in a state wherein they are less than the threshold value a, where the calculation of the summation value S commences when an instantaneous intensity datum d becomes equal to or greater than the threshold value a, where the instantaneous intensity data d are sequentially added together from that point forward. If the instantaneous intensity data d is less than the threshold value a, then summing of the instantaneous intensity data d is discontinued.

Figure 16:
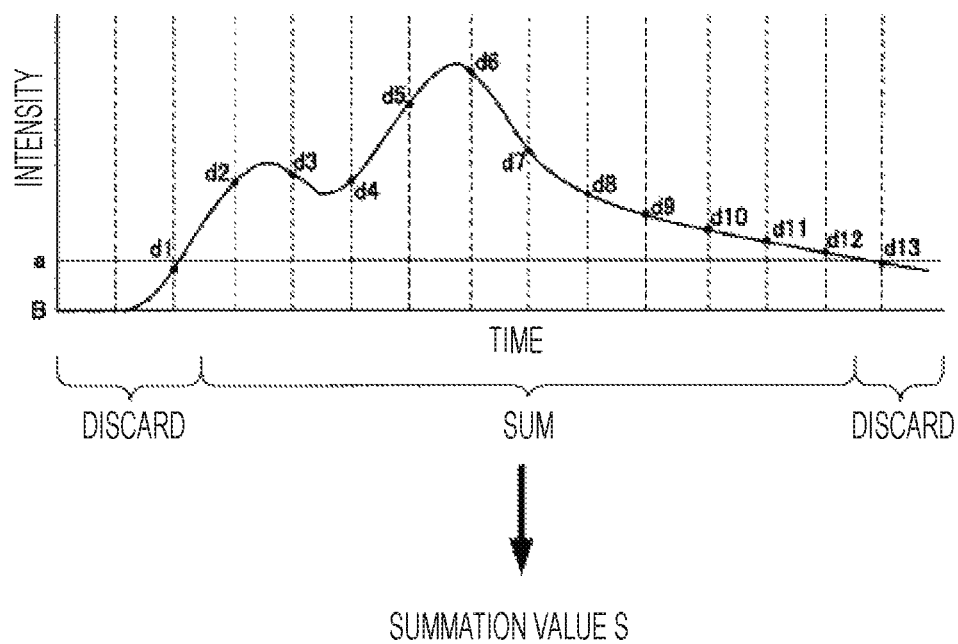
FIG. 16 is a schematic diagram for explaining the operation of the summing portion in relation to the second embodiment.
Figure 17:
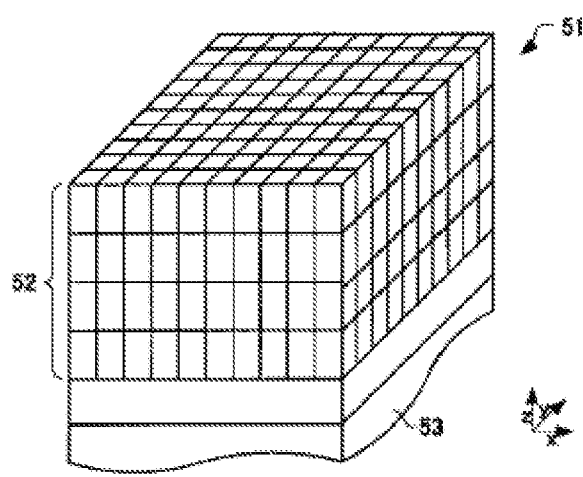
FIG. 17 is a schematic diagram for explaining the structure of a conventional radiation detector.
Figure 18:
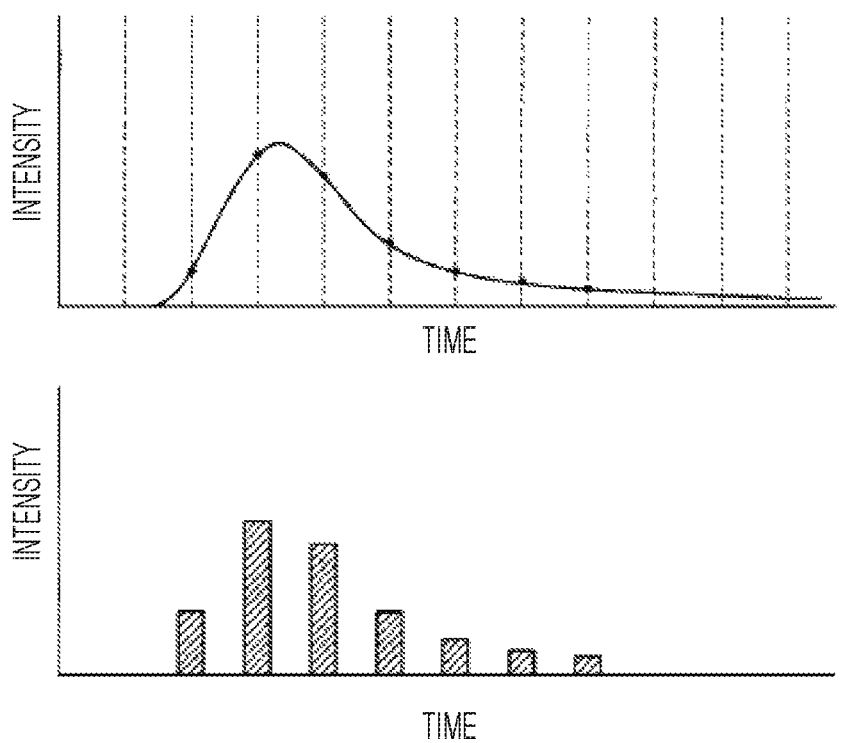
FIG. 18 is a schematic diagram for explaining the operation of a conventional radiation detector.
Figure 19:
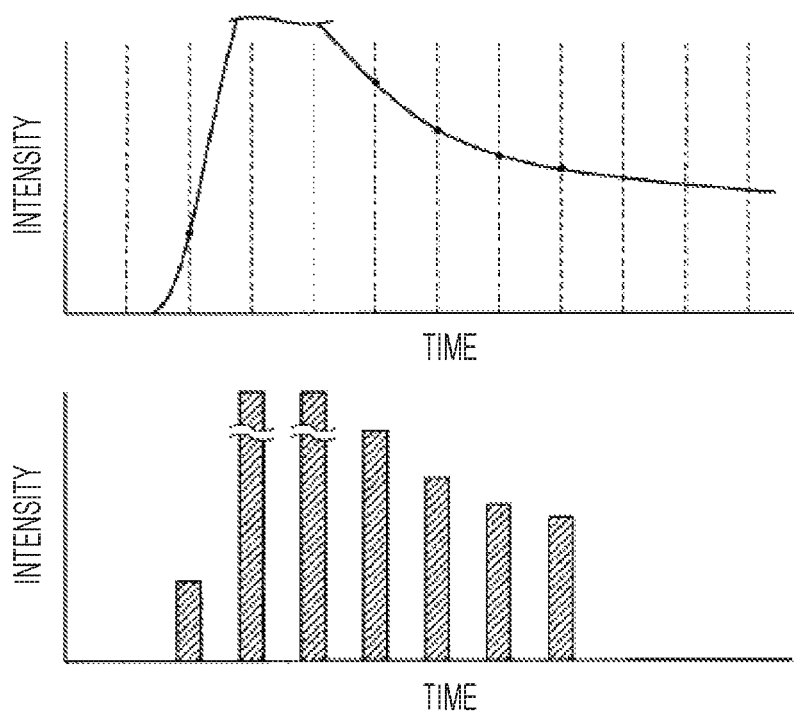
FIG. 19 is a schematic diagram for explaining the problem areas in the conventional radiation detector.

FIG. 16 is an explanation of the operation of the summing portion 15 in this case. Regardless of whether or not there is a threshold value, the summing portion 15 sums the instantaneous intensity data d beginning with the instantaneous intensity data d2 that is the first data d that is above the threshold value a, and, upon discovery of the instantaneous intensity data d13, wherein the instantaneous intensity data d is less than the threshold value a, discontinues summing with the last data being the instantaneous intensity data d12, which is prior to this instantaneous intensity data d13. The summing portion 15 calculates a summation value S for the two fluorescent emissions that are piled up. In this case, the summation value S that is produced is the total for the summation value for the fluorescent emission from the earlier event and the summation value for the fluorescent emission from the later event.

<Operation of the Later Event Estimating Portion 16>

The summation value S calculated by the summing portion 15 and the summation value Sa estimated by the earlier event estimating portion 14 are sent to the later event estimating portion 16. The later event estimating portion 16 calculates the summation value Sb by subtracting the summation value Sa from the summation value S. The summation value S is the summation value when one considers the fluorescent emission from the earlier event and the fluorescent emission from the later event as being a single event, where the summation value Sa is the summation value of the fluorescence from the earlier event, and thus the summation value Sb will be the summation value for the fluorescence from the later event. In this way, the later event estimating portion 16 estimates the summation value Sb for the fluorescent emission of the later event, of the two fluorescent emissions that are piled up. In this way, the later event estimating portion 16 estimates the summation value Sb for the fluorescent emission that is produced from the later of the two piled-up fluorescent emissions, through subtracting the summation value Sa, which was estimated by the earlier event estimating portion 14, from the summation value S, which was calculated by the summing portion 15.

As described above, the radiation detector 1 according to the present invention enables accurate summation values Sa and Sb to be calculated even when there is an occurrence of pile-up of fluorescent emissions. That is, the summation value Sa of the fluorescent emission that is produced first, from among the two piled-up fluorescent emissions, is estimated based on the peak value of the fluorescent emission that is produced first, and then the summation value Sb of the fluorescent emission that is produced later is estimated by subtracting the estimated value for the summation value Sa of the earlier fluorescent emission from the summation value S that was calculated without distinguishing between the two fluorescent emissions that were piled up. The summation value S that was calculated without distinguishing between the two fluorescent emissions that were piled up is obtained through the summing portion 15 in the present invention, and thus is more accurate than with the conventional method for acquiring the summation value S. Consequently, the present invention enables the summation value S for the fluorescent emission of the later event to be calculated accurately.

The structure set forth above describes the radiation detector 1 according to the present invention in more detail. If the summation values Sa that are stored in the storing portion 35 are actual measurements of radiation in a state wherein no pile-up event has occurred, then the estimates of time-based changes in fluorescent intensity can be made more accurately. If pile-up were to occur when generating the time constants for fluorescent emissions to serve as references in estimating the fluorescent intensities of the earlier events, then this would confuse the time-based change in the fluorescent emission.

The structure set forth above describes the radiation detector 1 according to the present invention in more detail. If the summation values Sa that are stored in the storing portion 35 are calculated by the summing portion 15, then the estimates of the summation values Sa can be made more accurately. Consequently, the present invention enables accurate calculation of the summation values Sa of the fluorescent emissions of the earlier events.

The present invention is not limited to the structures set forth above, but rather may be embodied in other forms, as described below:

(1) Each of the set points in the respective embodiments were illustrative examples. Consequently, each of the set points can be changed freely.

(2) While the scintillator crystal described in the embodiments set forth above was structured from LYSO, in the present invention the scintillator crystals may be structured from other materials, such as LGSO ($Lu_{2(1-x)}G_{2x}SiO_5$) or GSO ($Gd_2SiO_5$), or the like, instead. This alternative example enables the provision of a method for manufacturing a radiation detector that enables the provision of a less-expensive radiation detector.

(3) While in each of the embodiments set forth above the photodetectors were structured from photoelectron multiplier tubes, the present invention is not limited thereto. Photodiodes, avalanche photodiodes, semiconductor detectors, or the like, may be used instead of the photoelectron multiplier tubes.

[Explanations of Reference Symbols]
2: Scintillator
11: Data Monitoring Portion
12: Pile-up Event Identifying Portion
13: Peak Value Acquiring Portion
14: Earlier Event Estimating Portion
15: Summing Portion
16: Later Event Estimating Portion
35: Storing Portion

What is claimed:

1. A radiation detector, comprising:
a scintillator configured to convert radiation into a fluorescent emission;
a data monitoring portion configured to continuously output instantaneous intensity data indicating an instantaneous intensity of a fluorescent emission at each time of detection in a course from production of the fluorescent emission that is produced through incidence of radiation on the scintillator, through decay of the fluorescent emission; and
a summing portion configured to calculate a summation value indicating an intensity of the fluorescent emission produced in the scintillator through summing the instantaneous intensity data for fluorescent emission intensities that are greater than a threshold value, without summing the instantaneous intensity data for fluorescent emission intensities that are less than the threshold value.

2. The radiation detector as set forth in claim 1, wherein:
the threshold value referenced by the summing portion is set so as to be larger when the noise component increases, relative to a single component, in the instantaneous intensity data outputted by the data monitoring portion.

3. The radiation detector as set forth in claim 1, further comprising:
a storing portion configured to store a table that associates a summation value that indicates an intensity of a fluorescent emission and a peak value that is a maximum value for the intensity of the fluorescent emission in the course from the production of the fluorescent emission that is produced through incidence of radiation into the scintillator through to the attenuation of the fluorescent emission;
a peak value acquiring portion configured to acquire the peak value based on the instantaneous intensity data outputted by the data monitoring portion;
a pile-up event evaluating portion configured to evaluate, based on a time-based change in the instantaneous intensity data, a pile-up event that is a phenomenon wherein, in the course of decay of the fluorescent emission produced through incidence of the radiation into the scintillator, radiation is again incident into the scintillator so that the intensity of the fluorescent emission that had been decaying increases again;
an earlier event estimating portion configured to estimate, when a pile-up event has been identified, a summation value of the fluorescent emission of the earlier occurrence of two fluorescent emissions that are piled up, through reading out, from the storing portion, the summation value corresponding to the peak value from before the pile-up event, acquired by the peak value acquiring portion; and a later event estimating portion configured to estimate a summation value for the later-occurring fluorescent emission of two fluorescent emissions that are piled up, through subtracting, from the summation value calculated by the summing portion, a summation value estimated by the earlier event estimating portion.

4. The radiation detector as set forth in claim 3, wherein: the summation of the values stored in the storing portion are generated based on time-based changes in the intensity of the fluorescent emissions monitored by the data monitoring portion through exposure of the scintillator to radiation in a state wherein no pile-up event occurs.

5. The radiation detector as set forth in claim 3, wherein: the summation values stored in the storing portion are calculated by the summing portion.

6. A radiation detection method, comprising:
converting radiation into a fluorescent emission by a scintillator;
continuously outputting instantaneous intensity data indicating an instantaneous intensity of a fluorescent emission at each time of detection in the course from production of the fluorescent emission that is produced through incidence of radiation on the scintillator, through decay of the fluorescent emission; and
calculating a summation value indicating an intensity of the fluorescent emission produced in the scintillator through summing the instantaneous intensity data for fluorescent emission intensities that are greater than a threshold value, without summing the instantaneous intensity data for fluorescent emission intensities that are less than the threshold value.

7. The radiation detection method as set forth in claim 6, wherein:
the threshold value is set so as to be larger in response to the noise component increasing, relative to a single component, in the outputted instantaneous intensity data.

8. The radiation detection method as set forth in claim 6, further comprising:
storing a table that associates a summation value that indicates an intensity of a fluorescent emission and a peak value that is a maximum value for the intensity of the fluorescent emission in the course from the production of the fluorescent emission that is produced through incidence of radiation into the scintillator through to the attenuation of the fluorescent emission;
acquiring the peak value based on the outputted instantaneous intensity data;
evaluating, based on a time-based change in the instantaneous intensity data, a pile-up event that is a phenomenon wherein, in the course of decay of the fluorescent emission produced through incidence of the radiation into the scintillator, radiation is again incident into the scintillator so that the intensity of the fluorescent emission that had been decaying increases again;
estimating, when a pile-up event has been identified, a summation value of the fluorescent emission of the earlier occurrence of two fluorescent emissions that are piled up, through reading out the summation value corresponding to the peak value from before the acquired pile-up event; and
estimating a summation value for the later-occurring fluorescent emission of two fluorescent emissions that are piled up, through subtracting, from the summation value, an estimated summation value.

9. The radiation detection method as set forth in claim 8, wherein:
the summation of the stored values are generated based on time-based changes in the monitored intensity of the fluorescent emissions through exposure of the scintillator to radiation in a state wherein no pile-up event occurs.

10. The radiation detection method as set forth in claim 8, wherein:
the stored summation values are calculated.

11. A radiation detector, comprising:
a scintillator configured to convert radiation into a fluorescent emission; and
at least one processor, the at least one processor configured to:
continuously output instantaneous intensity data indicating an instantaneous intensity of a fluorescent emission at each time of detection in the course from production of the fluorescent emission that is produced through incidence of radiation on the scintillator, through decay of the fluorescent emission; and
calculate a summation value indicating an intensity of the fluorescent emission produced in the scintillator through summing the instantaneous intensity data for fluorescent emission intensities that are greater than a threshold value, without summing the instantaneous intensity data for fluorescent emission intensities that are less than the threshold value.

* * * * *